United States Patent [19]

Anderson

[11] Patent Number: 5,255,631
[45] Date of Patent: Oct. 26, 1993

[54] METERING BIRD FEEDER

[76] Inventor: Marvin E. Anderson, 23009 - 55th West, Mountlake Terrace, Wash. 98043

[21] Appl. No.: 991,572
[22] Filed: Dec. 16, 1992
[51] Int. Cl.⁵ .............................................. A01K 39/01
[52] U.S. Cl. ................................ 119/52.2; 119/56.1
[58] Field of Search ................. 119/52.2, 52.3, 55, 119/56.1

[56] References Cited

U.S. PATENT DOCUMENTS

| Re. 32,970 | 7/1989 | Furlani | 119/52.3 |
|---|---|---|---|
| 1,108,566 | 8/1914 | Foster | |
| 1,344,987 | 6/1920 | Choiniere | 119/55 |
| 2,773,474 | 12/1956 | Dodds | 119/55 |
| 2,997,981 | 8/1961 | Siggins | 119/55 |
| 3,083,687 | 4/1963 | Slaven | 119/52.2 |
| 5,105,765 | 4/1992 | Loken | 119/52.3 X |

Primary Examiner—Robert P. Swiatek
Attorney, Agent, or Firm—Christensen, O'Connor, Johnson & Kindness

[57] ABSTRACT

An elongated teeter-totter feed trough with perches on its opposite ends has a central portion pivotally connected to a housing. The upper portion of the housing forms a hopper for bird feed. A mechanical linkage assembly interconnects the trough with upright feed shafts at opposite sides of the hopper. Rocking motion induced by birds landing on the end perches reciprocates the shafts relative to the housing. Each shaft has a cavity that passes a bottom outlet of the hopper as the shaft is moved. Particulate feed in the hopper fills the feed shaft cavities for carrying a measured quantity of feed from the hopper to chutes that dispense the feed to the trough.

11 Claims, 5 Drawing Sheets

METERING BIRD FEEDER

FIELD OF THE INVENTION

The present invention relates to a bird feeding device in which feed is dispensed in regulated amounts in response to the action of a bird being fed.

BACKGROUND OF THE INVENTION

Bird feeders commonly are static devices consisting of upright hoppers with bottom outlets into feed troughs. Stationary perches can be mounted adjacent to the troughs.

Exceptions to the static bird feeder are shown in Siggins U.S. Pat. No. 2,997,981, issued Aug. 29, 1961; Dodds U.S. Pat. No. 2,773,474, issued Dec. 11, 1956; and Slaven U.S. Pat. No. 3,083,687, issued Apr. 2, 1963.

In the device disclosed in the Siggins patent, a movable perch is interconnected with a swinging agitator finger next to the hopper outlet to lessen the tendency of feed becoming clogged at the outlet.

In the device disclosed in the Dodds patent, the bottom of a hopper is closed by brushes that normally prevent feed from passing downward to outlets at opposite sides of the hopper. An elongated feed trough having end perches is swingably mounted below the hopper. The trough is interconnected with looped wire bails that extend upward through the brushes. Swinging of the feed trough moves the bails to bend the bristles of the brushes and permit expulsion of feed past the brushes into the trough.

In the device disclosed in the Slaven patent, the bottom outlet of a hopper is normally closed by a circular valve plate or disk. The disk is connected to a pendulum feed trough having perches positioned such that feed is dispensed by the action of a bird landing on a perch, which tilts the valve plate and thereby partially opens the outlet.

SUMMARY OF THE INVENTION

The present invention provides an improved bird feeder of the type having a movable feed trough below a hopper. The trough is interconnected with mechanism for metering feed from the hopper by the action of a bird landing on a perch carried by the trough. In the preferred embodiment, the trough is elongated with perches on its opposite ends and is mounted in teeter-totter fashion to a housing that also forms the hopper. A mechanical linkage assembly interconnects the trough with upright feed shafts at opposite sides of the hopper such that rocking motion induced by birds landing on the end perches reciprocates the shafts relative to the housing. Each shaft has a cavity that passes a bottom outlet of the hopper as the shaft is moved. Particulate feed in the hopper fills the feed shaft cavity for carrying a measured quantity of feed from the hopper to chutes that dispense the feed to the trough. The feeder is designed to clear clogging or jamming in the area of the outlet of the feed trough. The result is a reliable, smooth-acting and interesting feeder.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
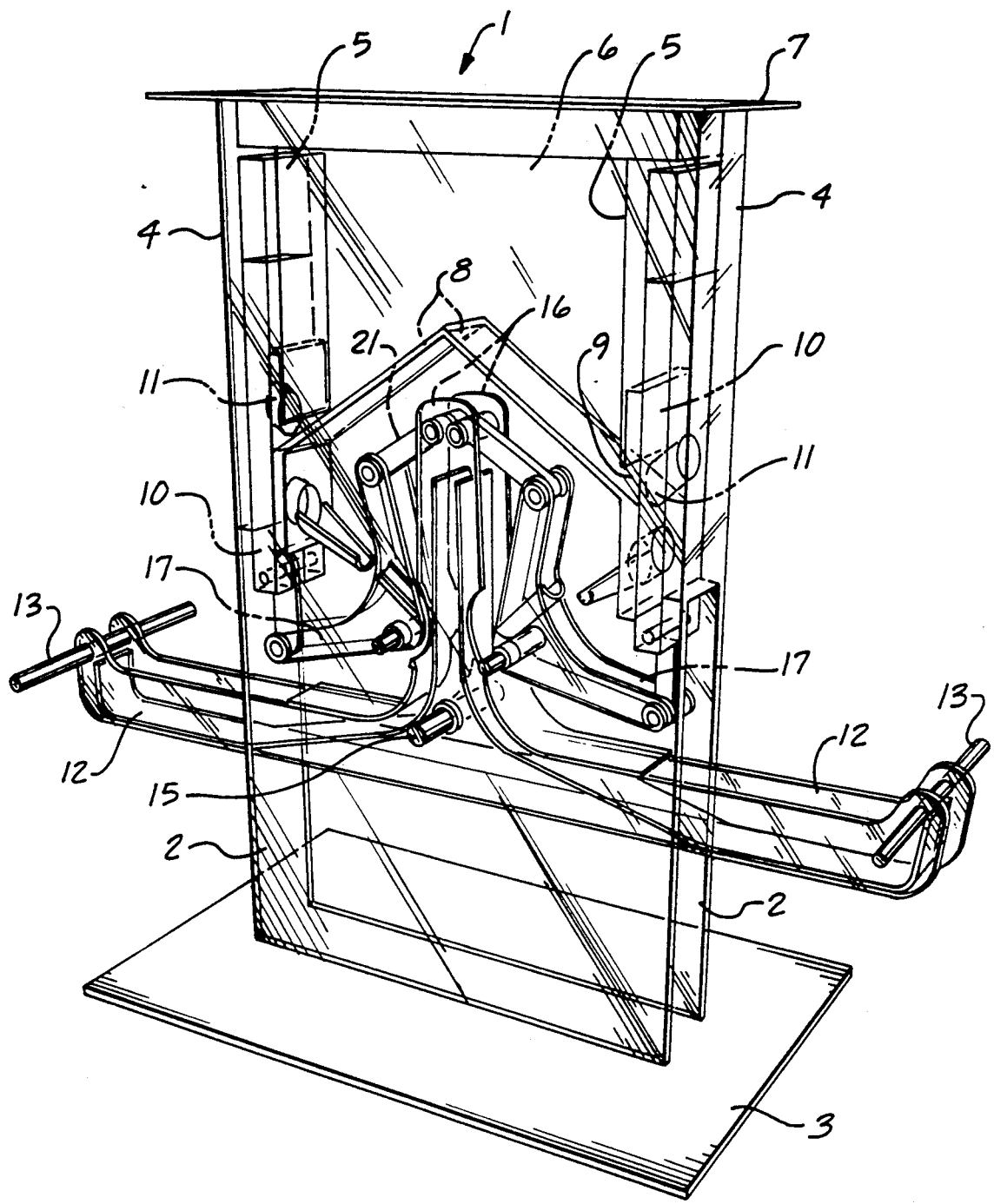
FIG. 1 is a perspective of a metering bird feeder in accordance with the present invention.

With reference to FIG. 1, most component parts of the preferred form of bird feeder 1 in accordance with the present invention are made of transparent plastic so that the internal workings of the feeder can be viewed. The feeder includes a housing having parallel upright front and back plates 2 extending upward from a suitable base 3. The narrow area between the bottom portions of the plates 2 is open, whereas the upright marginal portions of the upper portions of the front and back plates are joined to side plates 4 and inner wall plates 5 to form a hopper 6. The top of the feeder has a removable lid 7 for access to the hopper. The bottom of the hopper is closed by oppositely inclined floor plates 8 which meet at approximately the transverse center of the feeder and which form ramps leading downward and outward to horizontal outlets 9. The outlets open below the bottom edges of the wall plates 5.

The hopper outlets 9 are closed by long vertical feed shafts 10 that are slidable up and down in the rectangular spaces between the side plates 4 and wall plates 5. The feed shafts have cylindrical cavities 11 inclined downward and inward which, during operation of the feeder as described below, move past the hopper outlets 9. In general, particulate feed loaded in the hopper is biased by gravity through the outlet openings 9, into the cavities 11 of shafts 10. As a shaft moves downward, a controlled amount of feed carried in the corresponding cavity is dispensed into a bottom teeter-totter feed trough 12 having end perches 13.

The mounting of the teeter-totter feed trough 12 and its interconnection with the upright feed shafts 10 is best described with reference to FIG. 2. Trough 12 is swingably mounted between the front and back plates 2 by a central pivot shaft 15. The trough includes a central vertical portion 16. Two bell cranks 17 are mounted, respectively, at opposite sides of such central vertical portion 16. Each bell crank swings on a shaft 18 that is fixed relative to the front and back plates 2. The bell cranks include upright legs 19 and outward-extending legs 20.

The upper portions of the upright bell crank legs 19 are connected to the top of the trough vertical portion 16 by generally horizontal links 21. The mechanical interconnection of the trough with the vertical feed shafts 10 is completed by vertical links 22 having lower ends pivoted to the outer ends of the bell crank legs 20 and upper ends pivoted to the bottom ends of the feed shafts. The result is a construction in which see-saw swinging of the feed trough 12 induces up and down reciprocation of the feed shafts 10.

Figure 2:
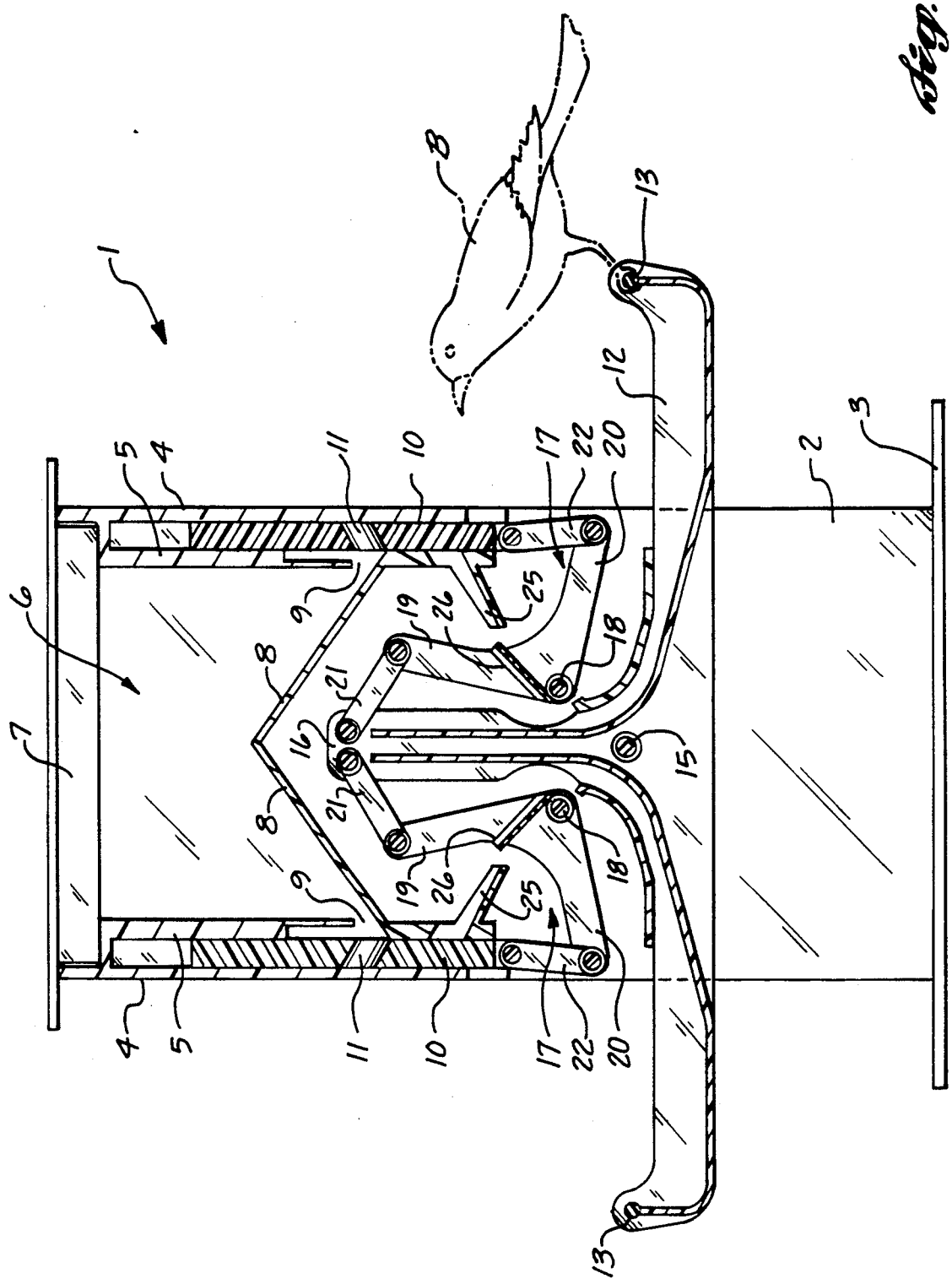
FIG. 2 is a transverse vertical section of the feeder of FIG. 1.
Figure 3:
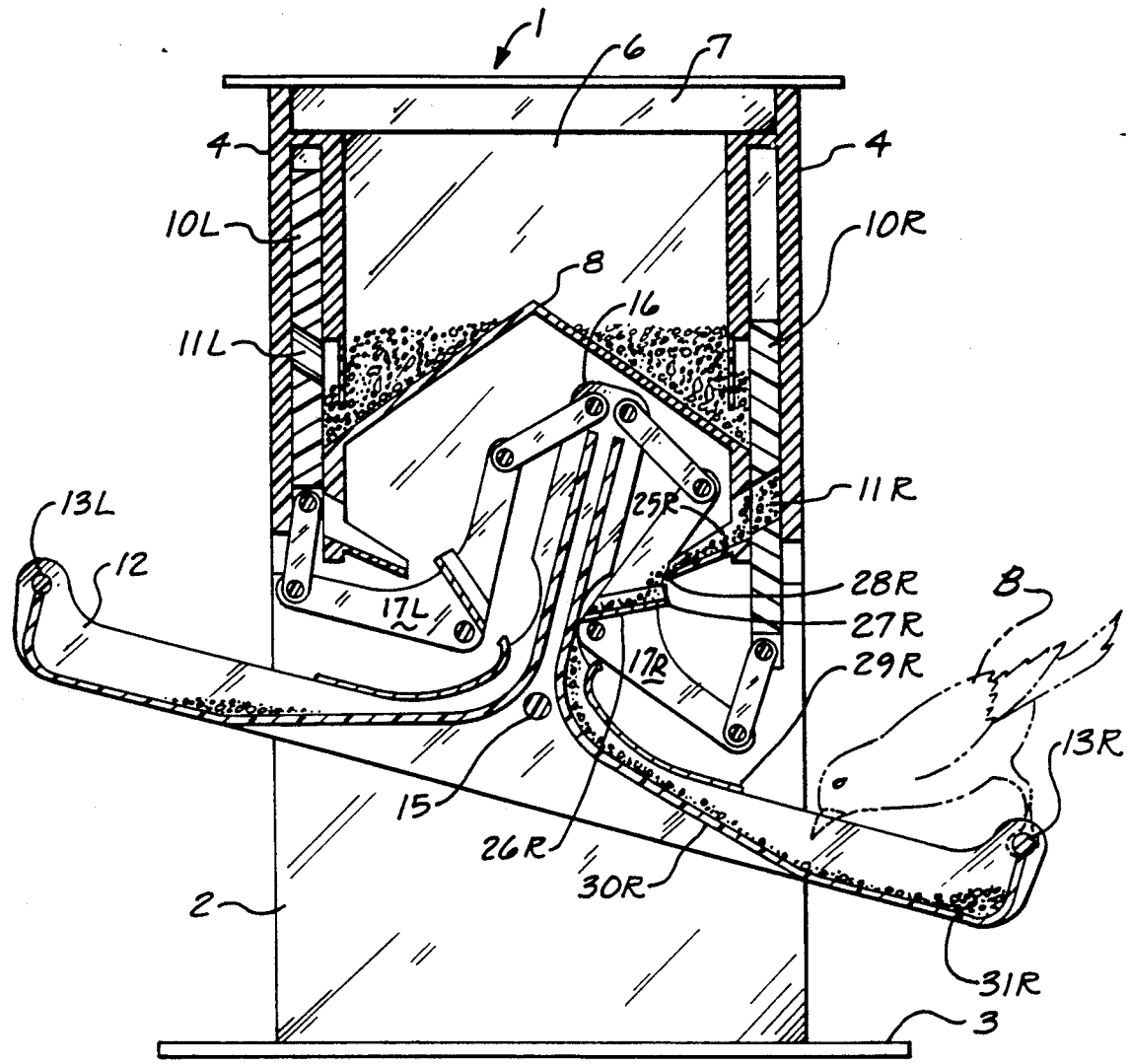
FIG. 3 and FIG. 4 are transverse vertical sections corresponding to FIG. 2 but with parts in different positions to illustrate operation of the feeder.

In the balanced central position of the teeter-totter feed trough shown in FIG. 2, the cavities 11 in the feed shafts 10 are registered with the hopper outlets 9 so that particulate feed in the hopper is biased by gravity along the bottom floor plates or ramps 8 into the cavities 11. The weight of a bird B landing on one or the other perch 13 of the feed trough has the effect of swinging the trough about its central pivot shaft 15, such as to the tilted position illustrated in FIG. 3 in which the feed trough is rotated clockwise through a small acute angle from its balanced position. Such swinging causes corresponding swinging of the bell cranks 17, such that the feed shaft 10R at the right is pulled down and the feed shaft 10L at the left is pushed up. Downward movement of shaft 10R shifts the location of the feed-containing cavity 11R downward to a position in which the cavity registers with a downward and inward extending chute 25R. Also, a short second chute 26R carried by the central portion of the right bell crank 17R swings to a position in which its inlet end 27R is located substantially directly below the outlet end 28R of chute 25R. Chutes 25R and 26R lead toward the center of the feed trough. Inclined baffles 29R and 30R guide the feed to the outer end 31R of the trough which projects from the feeder housing. The result is that feed in the cavity 11R of shaft 10R is discharged into chutes 25R and 26R, then into the corresponding end 31R of the teeter-totter feed trough for access by the bird on the perch 13R.

Figure 4:
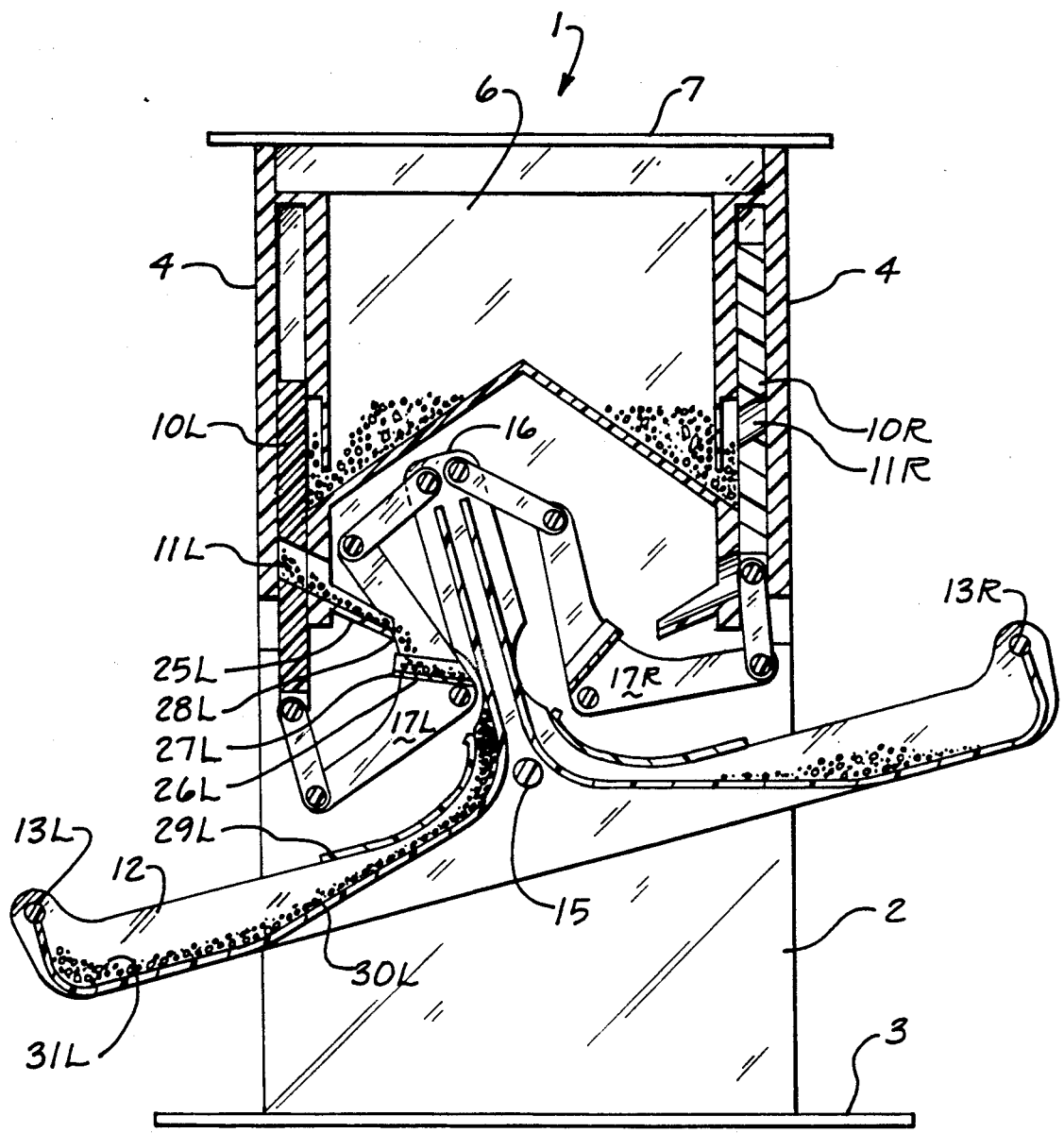

Similarly, with reference to FIG. 4, if a bird lands on the opposite perch 13L, the teeter-totter feed trough 12 is swung oppositely and feed from the left cavity 11L of shaft 10L is discharged into the left end portion 31L of the feed trough for the bird on perch 13L. Birds quickly learn the back and forth action required in order to receive a desired quantity of feed.

Figure 6:
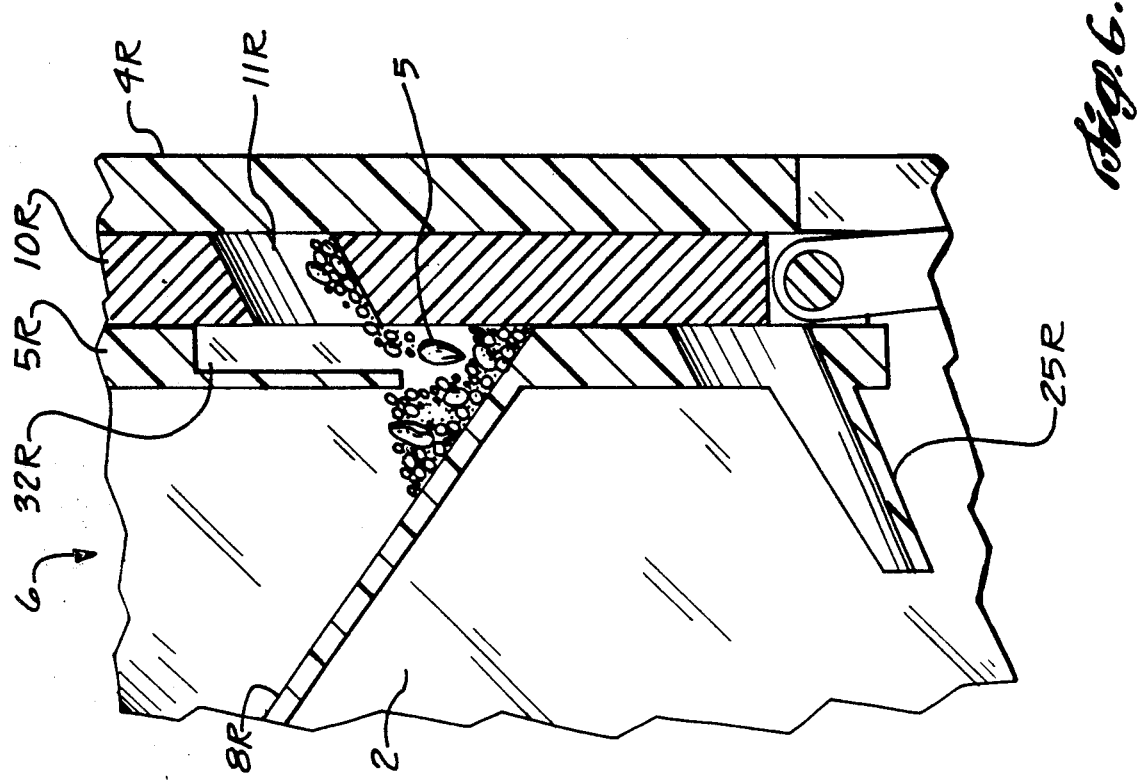
FIG. 5 and FIG. 6 are corresponding, enlarged, fragmentary, detail sections illustrating the action of the feeder in accordance with the present invention clearing feed that has jammed the feeder.
Figure 5:
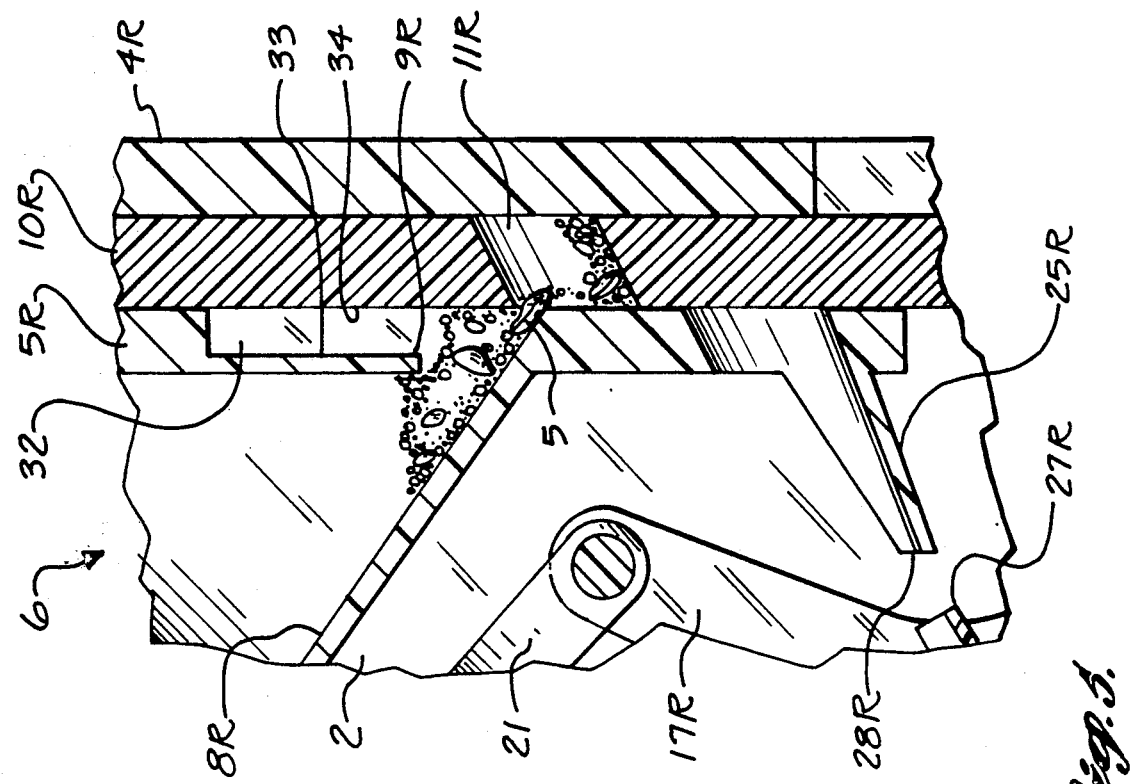

With reference to FIG. 5 and FIG. 6, occasionally irregularly sized feed jams normal smooth operation of the feeder. For example, FIG. 5 illustrates a large seed S which has passed along the floor plate or ramp 8R through the outlet 9R and into a position blocking normal downward movement of feed shaft 10R. Seed S is caught between the inner edge of cavity 11R and the end of ramp 8R. In accordance with the present invention, feed reset wall plate 5R has a notch 32 so that the lower portion of the wall plate forms a vertical waffle spaced inward from the corresponding feed shaft. Consequently, a vertically extending unobstructed feed reset area is formed between the outer side 33 of the wall plate and the inner side 34 of the feed shaft 10R. Although the feed shaft 10R is prevented from moving downward, the shaft is free to move upward to the position of FIG. 6. The unobstructed reset area allows the jammed seed to fall out of the cavity 11R when the feed shaft moves up, such that the cavity fills in the normal manner when the feed shaft moves back down. The construction at the opposite side of the feeder is the mirror image of the construction at the right. Without the unobstructed reset areas, the weight of feed in the hopper could prevent a jammed seed from being dislodged during normal operation of the hopper.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A bird feeder for dispensing particulate feed comprising a housing including an upright hopper for the particulate feed, said hopper having an outlet opening in the lower portion thereof, a feed shaft closing said outlet opening, said feed shaft having a feed cavity, means mounting said shaft for movement relative to said outlet opening between a first position in which said cavity of said shaft is registered with said outlet opening for receiving particulate feed through said outlet opening and a second position in which said cavity is out of registration with said outlet opening for conveying feed in said cavity away from said outlet opening for dispensing such feed, a feed trough, means mounting said feed trough on said housing for movement relative thereto and in position to receive feed dispensed when said feed shaft is moved from said first position to said second position, and means mechanically interconnecting said feed trough and said feed shaft such that movement of said feed trough relative to said housing effects movement of said feed shaft from said first position to said second position.

2. The feeder defined in claim 1, in which the feed shaft is mounted for vertical reciprocating movement relative to the hopper between the first and second positions, the first position of the feed shaft being higher than the second position.

3. The feeder defined in claim 1, in which the shaft mounting means mounts the shaft for vertical reciprocating movement relative to the hopper outlet opening, the first position of the feed shaft in which the cavity is registered with the outlet opening being higher than the second position such that the feed cavity is offset downward from the outlet opening when the feed shaft is in the second position, the feed shaft being movable to a third position in which the cavity is offset upward from the hopper outlet opening, and the feed shaft being mounted for vertical reciprocating movement relative to the hopper between the second and third positions.

4. The feeder defined in claim 3, including an upright baffle spaced from the feed shaft and extending upward from the hopper outlet opening so as to form an empty unobstructed feed reset area alongside the feed shaft above the outlet opening.

5. The feeder defined in claim 1, including pivot means mounting the feed trough for swinging relative to the housing, the feed trough including a feed-containing area extending in a first direction from said pivot means and an actuating portion extending in a second direction from said pivot means, the interconnecting means including a bell crank having a central portion pivoted to the housing and opposite legs connected, respectively, to the feed shaft and said actuating portion of the feed trough.

6. The feeder defined in claim 1, in which the housing includes an inclined floor plate defining the bottom of the hopper and inclined downward toward the hopper outlet opening.

7. A bird feeder for dispensing particulate feed comprising a housing including an upright hopper for the particulate feed, said hopper having an outlet opening in the lower portion thereof, a feed shaft closing said outlet opening, said feed shaft having a feed cavity, means mounting said shaft for movement relative to said outlet opening between a first position in which said cavity of said shaft is registered with said outlet opening for receiving particulate feed through said outlet opening and a second position in which said cavity is out of registration with said outlet opening for conveying feed in said cavity away from said outlet opening for dispensing such feed, a feed trough positioned to receive feed dispensed when said feed shaft is moved to said second position, a perch, means mounting said perch on said housing for movement relative thereto, and means mechanically interconnecting said perch and said feed shaft such that movement of said perch relative to said housing effects movement of said feed shaft from said first position to said second position.

8. A bird feeder for dispensing particulate feed comprising a housing including an upright hopper for the particulate feed, said hopper having opposite upright sides each including an outlet opening in the lower portion thereof, a pair of upright feed shafts each closing one of said outlet openings and each having a feed cavity, means mounting said shafts for vertical reciprocating movement relative to said outlet openings such that each of said shafts is movable between a first position in which its feed cavity is offset upward from said feed shaft and a second position in which such cavity is offset downward from said feed shaft such that, in a central position between said first and second positions, such cavity is registered with said outlet opening for receiving particulate feed through said outlet opening, an elongated feed trough pivotally mounted to said housing below said hopper and having opposite end portions extending beyond the opposite sides of said hopper for see-saw swinging motion of said feed trough relative to said housing, and means mechanically interconnecting said feed trough and said feed shafts such that see-saw swinging movement of said feed trough relative to said housing effects vertical reciprocation of said feed shafts between the first and second positions of said shafts.

9. The feeder defined in claim 8, including two upright baffles spaced from the feed shafts, respectively, and extending upward from the hopper outlet openings so as to form empty unobstructed feed reset areas alongside the feed shafts above the outlet openings.

10. The feeder defined in claim 8, in which the feed trough includes an upright actuating central portion, the interconnecting means including two bell cranks pivotally mounted at opposite sides of said central portion, respectively, each of said bell cranks having a first leg connected to said actuating central portion and a second leg connected to one of the feed shafts.

11. The feeder defined in claim 8, in which the hopper includes two oppositely inclined floor plates, each of said floor plates being inclined downward and outward toward one of the hopper outlet openings.

* * * * *